Dec. 8, 1936.　　V. E. CARBONARA　　2,063,790
VIBRATION RECORDING INSTRUMENT
Filed Aug. 4, 1932　　3 Sheets-Sheet 1
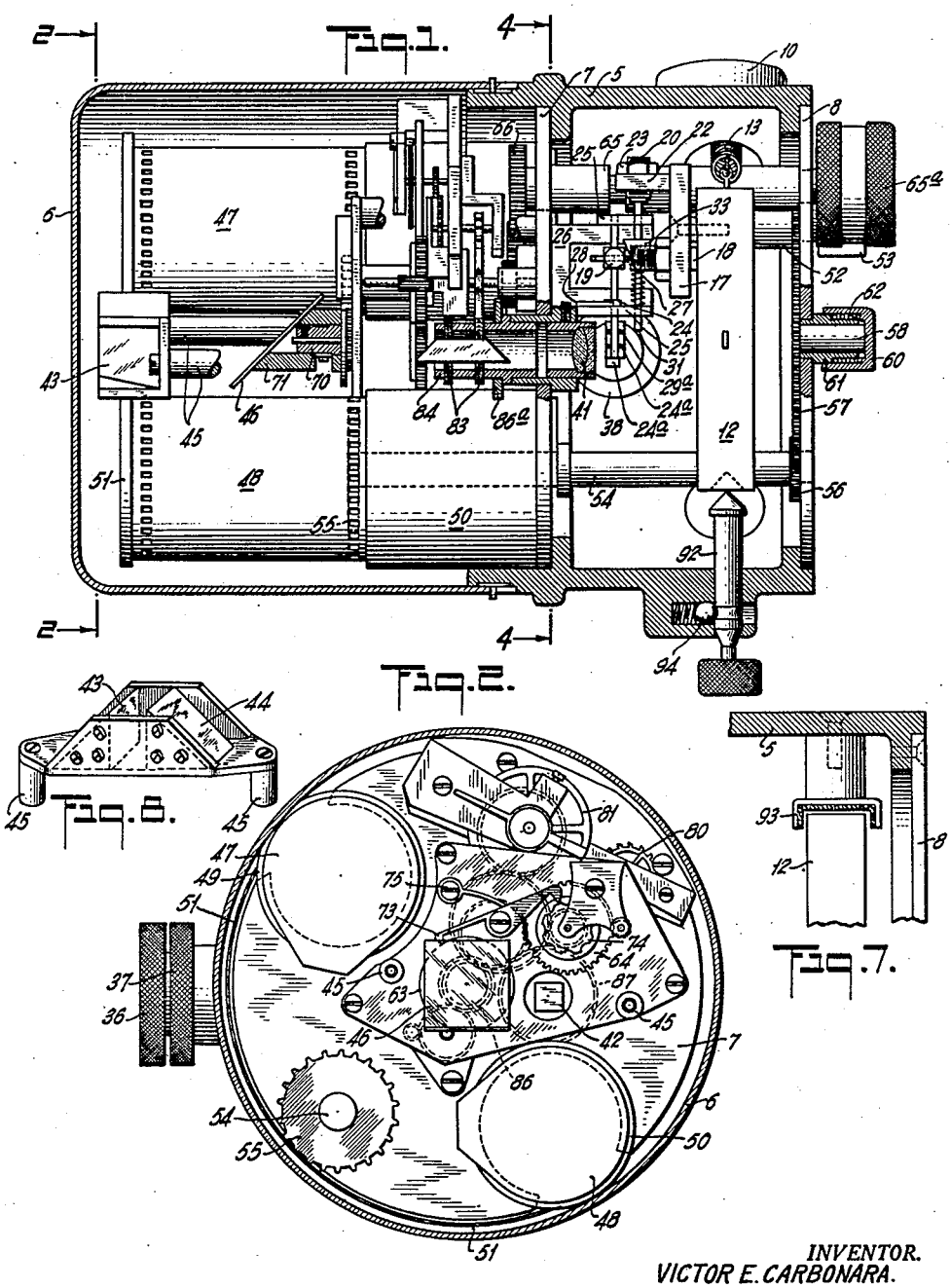
INVENTOR.
VICTOR E. CARBONARA.
BY Stephen Gerstvik.
ATTORNEY.

Dec. 8, 1936. V. E. CARBONARA 2,063,790
VIBRATION RECORDING INSTRUMENT
Filed Aug. 4, 1932 3 Sheets-Sheet 2
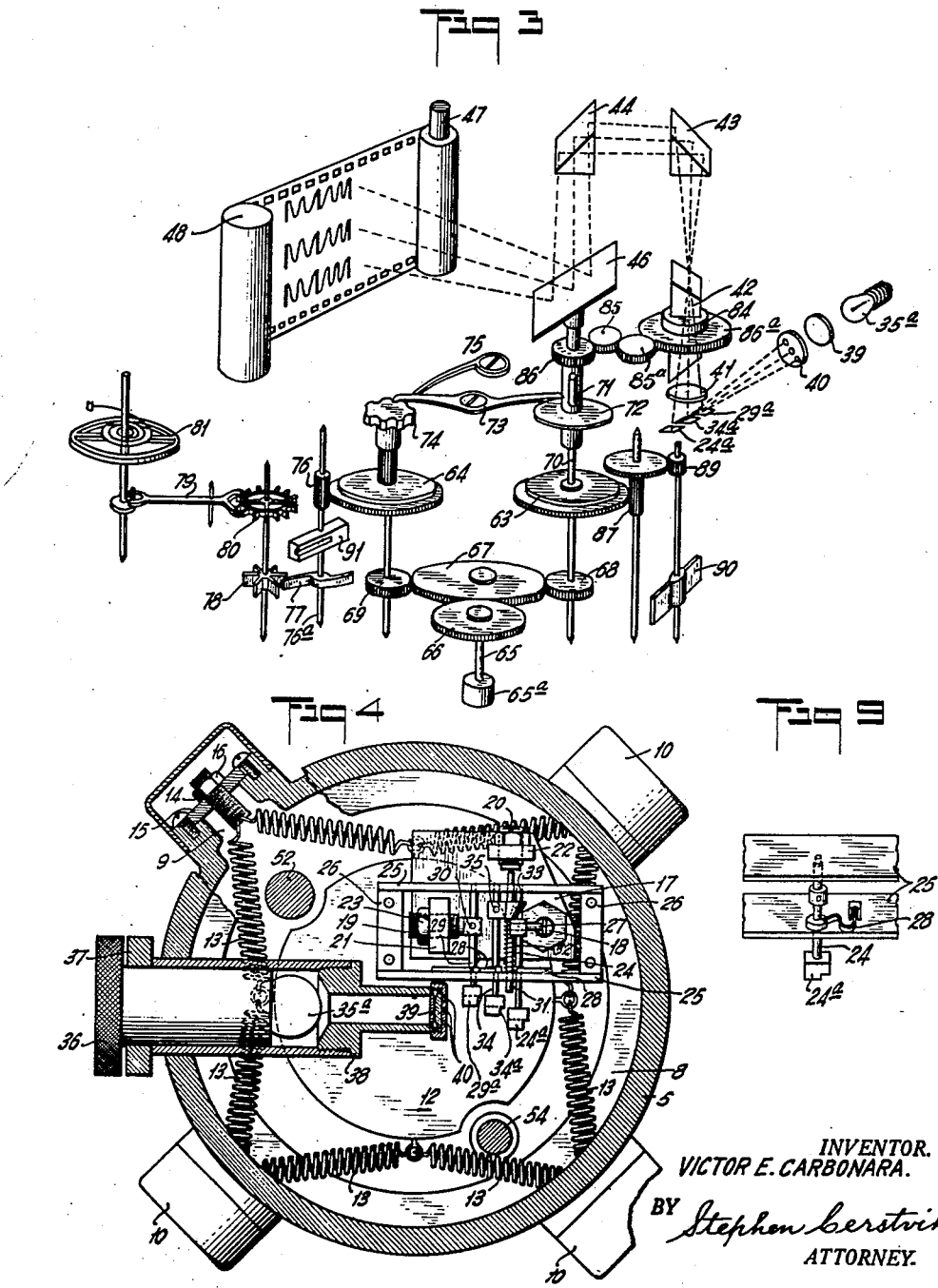
INVENTOR.
VICTOR E. CARBONARA.
BY Stephen Gerstvik.
ATTORNEY.

Dec. 8, 1936.  V. E. CARBONARA  2,063,790
VIBRATION RECORDING INSTRUMENT
Filed Aug. 4, 1932  3 Sheets-Sheet 3
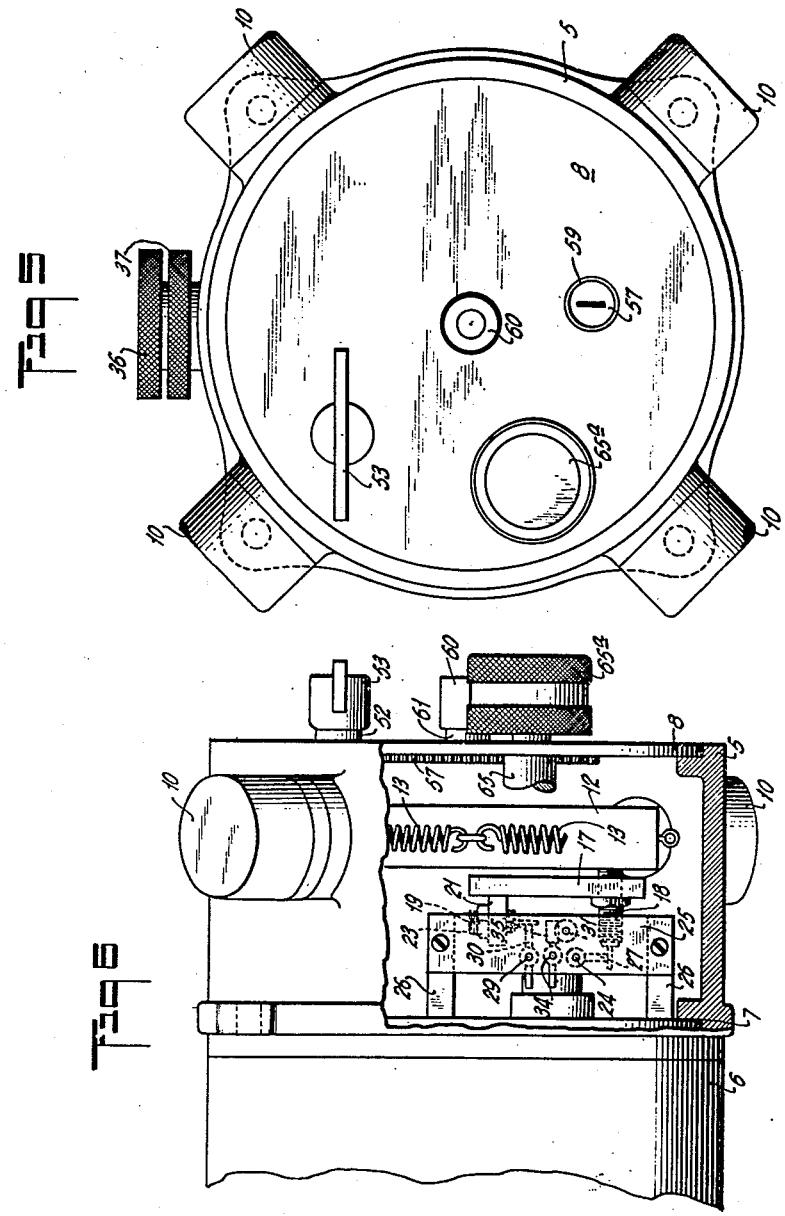
INVENTOR.
VICTOR E. CARBONARA.
BY Stephen Gerstvik
ATTORNEY Patented Dec. 8, 1936

2,063,790

UNITED STATES PATENT OFFICE 2,063,790

VIBRATION RECORDING INSTRUMENT

Victor E. Carbonara, Rockville Centre, N. Y., assignor to Bendix Aviation Corporation, South Bend, Ind., a corporation of Delaware Application August 4, 1932, Serial No. 627,483

4 Claims. (Cl. 234—5.6)

This invention relates to recording instruments, and more particularly to means for recording vibrations.

One of the objects of the present invention is to provide novel means for recording the fundamental characteristics of vibrations, that is, the amplitude, form and/or frequency of said vibrations.

Another object of this invention is to provide a novel recording instrument which is so constructed as to make a permanent visual record of the amplitude, along three mutually perpendicular axes, the form, and the frequency of the vibrations imparted to the member on which the instrument is mounted.

Still another object is to provide an instrument of the above character of such size, shape and weight that the same will not materially after the vibration characteristics of a member upon which it is adapted to be mounted.

A further object is to provide a novel vibration recording instrument of the photographic type which is adapted for use in determining the nature of the vibrations of a movable structure such as, for example, the instrument board of an airplane.

A still further object is to provide novel means for obtaining a visual record of the characteristics of the component of the vibrations imparted to a member along one or a plurality of axes irrespective of their angular relation to one another.

Another object is to provide novel means in a vibration recording instrument, or vibrograph, for producing a substantially undistorted, uniform record of the amplitudes and frequencies of the components of vibrations imparted to the instrument along a plurality of axes.

The above and further objects and novel features of the present invention will more fully appear from the following detailed description when taken in connection with the accompanying drawings. It is to be expressly understood, however, that the drawings are for the purpose of illustration only and are not designed as a definition of the limits of the invention, reference being primarily had for this purpose to the appended claims.

In the drawings wherein life reference characters refer to like parts throughout the several views:

Fig. 1 is a side elevation, partly in section and with parts broken away, of an instrument embodying the present invention;

Fig. 2 is a transverse view of the same taken on line 2—2 of Fig. 1 with the prisms in the rear of the casing removed;

Fig. 3 is a schematic view of one form of the power mechanism and the optical system which may be employed in carrying out the present invention;

Fig. 4 is a cross-sectional view, with parts broken away, taken on line 4—4 of Fig. 1;

Fig. 5 is a front end view;

Fig. 6 is a top plan view, partly in section and with parts broken away, of the instrument shown in Fig. 1;

Fig. 7 is a detail view, partly in section, illustrating a portion of one form of steadying means for the reference member employed in carrying out the invention;

Fig. 8 is a detail view showing a portion of the optical system employed; and

Fig. 9 is an enlarged perspective view illustrating a light directing member which may be employed.

Only one embodiment of the novel vibrograph or vibration recording instrument, comprehended by the present invention, has been illustrated in the accompanying drawings in which the instrument is shown as comprising a cylindrical housing 5, to the rear of which is detachably secured by means of a pin and slot connection a metal cup 6, the members 5, 6 constituting the instrument case. A disc 7 secured to an internal flange in housing 5 constitutes a partition which divides the instrument case into rear and front compartments, the latter being closed by a disc 8 secured in any suitable manner to the front end of housing 5. Said housing is provided with a plurality of flanged openings 9 (Fig. 4) about its periphery, the purpose of which will be hereinafter explained. Preferably, four such openings are provided and, as shown, are spaced at substantially 45 degrees on either side of the vertical center line of housing 5. Each of said openings may be provided with a cup-shaped cover 10. The case is adapted to be mounted on a vibrating member and, accordingly, when so mounted the vibrations of the member are imparted to the same.

In order to obtain a record of the amplitude and form of the vibrations to which the case is thus subjected, it is necessary to refer the vibratory motion to a member whose motion is constant and the character of which is known. The relative movement between the reference member and vibrating member may then be determined and from this the true characteristics of the vibratory motion may be calculated. If a stationary reference member is provided, the relative motion between said member and the vibrating member is a true rather than an apparent measure of the vibratory motion and the necessity for mathematical calculations may be dispensed with. A reference member having a motion which is independent of the vibratory motion of the casing, i. e., which is stationary with respect to the vibrations along the axes on which it is desired to measure the amplitude of the components of said vibrations, is therefore provided together with means for recording the relative motion along these axes between the casing and the reference member. The reference member provided will be referred to as being stationary since it has no appreciable movement in any plane with respect to the casing, that is, the reference member remains stationary while the casing vibrates about it. It is thus possible to obtain faithful records of the components of the vibrational motions of a member resolved along any desired axis, and such records may be compared with an arbitrary standard for obtaining the desired data.

The stationary reference member employed in carrying out the present invention preferably comprises an inertia member in the form of a cylindrical block or mass 12 suspended by means of a plurality of yielding members such as coil springs 13 in the front portion of housing 5 in a manner such that the longitudinal axis of said mass coincides with the longitudinal axis of the instrument case 5, 6. Two springs 13 are attached to each of four eyelets secured to mass 12 at points in which the transverse horizontal and vertical axes of said mass intersect the periphery of the same. The springs are anchored to the instrument case 5, 6 by means of suitable adjusting screws 14 threaded into brackets 15 which are in turn secured by set screws to the flanged portions of openings 9. Suitable lock nuts 16 may be provided for adjusting screws 14, the latter serving as a means for adjusting the tension of springs 13. In order that mass 12 may be independent of vibrations of the case and therefore remain stationary, experiments have shown that the tension of springs 13 should be such that the natural frequency of the system is substantially one-fifth or less of the lowest frequency which it is desired to record.

That the relative movement between the case and the stationary mass is a true measure of the vibrations imparted to the case will now be clearly apparent. Although the amplitude and frequency of the components of the vibrations resolved along any desired axis may be obtained with a reference member of the above character, it is desirable to record only such data as will enable an observer to readily refer the same to the axis concerning which information is desired. In the illustrated form of the invention, therefore, provision has been made for recording the resolved components of the vibrations along three mutually perpendicular axes, mainly those axes corresponding to the longitudinal, vertical and transverse axes of the instrument.

For the purpose of obtaining these records, the present invention comprehends novel means for first converting the lineal components of the relative or vibratory motion along the three above named axes into angular motion of reflecting members, each of which represents one of said axes. As shown, such means are constituted by a plate 17 (Figs. 1 and 6) suitably secured to the rear face of mass 12 and spaced therefrom by means of washers. Plate 17 supports three screws 18, 19 and 20 (Fig. 4), the former being threadedly received by the plate itself and having its axis parallel to the longitudinal axis of the instrument, whereas the latter two are threadedly mounted in brackets 21 and 22 suitably secured to said plate and have their axes parallel to the transverse and vertical axes of the instrument case, respectively. These screws are threaded for the purpose of making calibrational adjustments and may be provided with suitable lock nuts 23. The inner ends of screws 18, 19 and 20 are ground to a plane surface and polished for reasons which will hereinafter appear. Since the above assembly is wholly supported by mass 12, the same will remain stationary with said mass.

Considering first the conversion of the longitudinal components of the vibrations, a vertically disposed rocker shaft 24 is rotatably supported by a pair of bearing plates 25 mounted on U-shaped brackets 26 which are secured in any suitable manner to disc 7. An arm 27 is operatively secured to shaft 24 and extends laterally therefrom in a direction parallel to the transverse axis of the instrument case 5, 6 so that the periphery of an enlarged disc-like portion on the end thereof is in sliding engagement with the polished end surface of screw 18. Any suitable means, such as a spring 28, may be provided for holding arm 27 in engagement with said surface. Thus, arm 27 is free to oscillate angularly in a horizontal plane perpendicular to the end surface of screw 18 because the outer end of the same is prevented from following the longitudinal vibrations of the instrument due to the fact that said screw is stationary as pointed out above. Shaft 24, on the other hand, vibrates with the instrument in this latter direction and is thereby rocked about its vertical axis through the oscillating action of arm 27 by an amount proportional to and in accordance with the longitudinal component of the vibrations to which the instrument is subjected.

The component of the vibratory movement of the case resolved along a transverse axis is converted into angular motion of shaft 29 mounted in the same manner as shaft 24 and provided with a horizontal arm 30 (Fig. 6) similar to arm 27, which extends parallel to the longitudinal axis of the instrument and is slidably held against the end surface of screw 19 by means of a suitable spring corresponding to spring 28. Arm 30 is, therefore, free to oscillate angularly in a horizontal plane perpendicular to the end surface of screw 19 and is adapted to rock shaft 29 about a vertical axis in accordance with the transverse component of the vibratory motion of the case.

For converting the vertical component of the vibrations into like angular motion, a vertically disposed spindle 31 slidably extends through plates 25 and is held with its upper end in sliding engagement with the lower end of screw 20 by a suitable spring 32 (Fig. 4). Spindle 31 is thereby maintained stationary in a vertical direction with respect to the mass but relative oscillating movement in a vertical direction takes place between spindle 31 and plates 25 when the latter vibrate vertically with the instrument casing 5, 6. Said spindle is provided with an inclined or conical portion 33 near its center. A shaft 34, corresponding to shafts 24 and 29, has a laterally extending arm 35 operatively attached thereto and extending laterally therefrom, said arm having an enlarged cylindrically shaped end portion which is adapted to be resiliently held in sliding engagement with the inclined surface of cone 33. As the outer end of arm 35 moves vertically with shaft 34 and plates 25 in response to the vibrations of the instrument case 5, 6, it is caused to follow the inclined surface of cone 33 and is thus oscillated angularly in a horizontal plane parallel to the end surface of screw 20, thereby rocking shaft 34 about a vertical axis in proportion to the amplitude of the vertical component of the vibrations of the case.

Shafts 24, 29 and 34 have extensions below the lower plate 25, said extensions being of varying lengths with that of shaft 29 the shortest and that of shaft 24 the longest. These extensions are provided at the lower ends of the same with enlarged cylindrical portions, the lower halves of which are cut away on a diameter that intersects the longitudinal axis of the instrument at an angle of substantially 45 degrees, and suitable reflecting members such as mirrors 24a, 29a and 34a are mounted on the flat surfaces thus formed.

Means are provided within casing 5, 6 for projecting a beam of light against each of the angularly movable mirrors 24a, 29a and 34a, thus making it possible to photographically record the rocking motion of said mirrors, which motion is representative of the components of the vibrations under investigation taken along the longitudinal, transverse and vertical axes of the casing. For this purpose, there is employed a small electric bulb 35a (Fig. 4) that is connected to a suitable source of current such as a battery (not shown). The lamp is mounted in any convenient manner in the side of housing 5 in line with mirrors 24a, 29a and 34a. Lamp socket 36 is surrounded by an opaque sleeve 37 and threaded into the inner end thereof having an extension tube 38 which carries at its inner end a pair of condenser lenses 39. The latter direct light beams through three small apertures 40 in a cup-shaped member threaded onto the inner end of tube 38. From apertures 40, the light beams are projected against mirrors 24a, 29a and 34a. Thus the light beams striking the mirrors all have angular oscillating motions imparted thereto in parallel horizontal planes and are then passed through a convergent lens 41 into the rear compartment of casing 5, 6, and through a rotatably mounted deflector or erecting prism 42, the purpose of which will be hereinafter described.

Means are provided for increasing the optical leverage of the beams so that with an instrument of small size a readily readable record may be obtained of vibrations having small amplitude and high frequency such as, for example, the vibrations imparted to the instrument board of an airplane. Preferably, such means are constituted by a pair of stationary prisms 43 and 44 (Figs. 1, 3 and 8) mounted in the rear of casing 5, 6, in a frame supported by rods 45. As will be noted in Fig. 4, prisms 43, 44 reflect the light beams through substantially 180 degrees onto a movable mirror 46 to be more fully described hereinafter.

Means are provided for positioning a light sensitive member or film in the path of the light beams after the same leave mirror 46 in order that a permanent visible record may be obtained of the amplitude, form and frequency of the vibrations or vibration components to be measured. For this purpose, there are provided a pair of film-carrying spools 47 and 48 mounted in suitable magazines or tubes 49 and 50 (Fig. 2), respectively, the latter in turn being suitably secured as by solder to disc 7. Arcuate guides 51 are provided on either side of the film for guiding the same from one spool to the other. A shaft 52, which projects through the face plate 8 and is provided on its outer end with a knob 53, may be employed for rotating spool 47 to wind the film from spool 48 to spool 47 and expose lengths of the same to the light beams as desired.

Means are provided for indicating the number of film exposures made and, as illustrated, such means comprise a shaft 54 journaled in discs 7 and 8, and provided on its inner end with a sprocket 55 that meshes with suitably spaced holes near the edge of the film. Shaft 54 is provided at its other end with a pinion 56 which normally meshes with an indicating dial 57 that is supported by means of a shaft 58 in disc 8 and is visible through a small opening 59 in said disc. Shaft 58 may be provided with a knob 60 (Fig. 1) which slidably fits over a sleeve 61, thus making it possible to move dial 57 out of mesh with pinion 56 for setting the same at zero reading without disturbing the spool 48 when a new roll of film has been inserted. Dial 57 is normally maintained in mesh with pinion 56 by means of a spring 62 interposed between knob 60 and sleeve 61.

If mirror 46 and the film are relatively stationary, only a plurality of superimposed exposures are obtained, and it would be impossible to determine from such a record the frequency of the vibrations or the varying amplitudes of the same if such should exist. The present invention, therefore, comprehends the use of a mirror adapted to be intermittently moved relative to the film for predetermined intervals of time. By counting the number of vibration cycles as recorded on the film during each of said intervals, the frequency is readily determined.

In the form illustrated, the means employed for rotating the mirror are constituted by a watch mechanism which comprises a pair of main spring housings or drums 63 and 64 (Fig. 3) in which coil springs (not shown) are adapted to be mounted. Said springs may be normally wound by means of a shaft 65 provided with a knob 65a through a train of gears 66, 67, 68 and 69, respectively. The spring in drum 63, as soon as the same is energized, drives the outer toothed portion thereof and rotates shaft 70. The latter is frictionally engaged by and drives a sleeve 71 to which mirror 46 is secured.

As pointed out above, it is desirable to impart intermittent motion to mirror 46. To this end, sleeve 71 is provided with a friction disc 72 which is engaged by a lever or pawl 73 that is pivoted intermediate its ends and adapted to be actuated by a cam wheel 74. A suitable spring, such as spring 75, may be provided for holding the pawl in engagement with said cam. The latter is drivably connected to drum 64 which is in mesh with a pinion 76. The lower end of shaft 76a, on which said pinion is mounted, is provided with a flipper 77 which engages a star 78, the rotation of which is controlled by a conventional escapement wheel and arm 79 and 80, respectively, and a balance wheel 81 such as is used for controlling the ticking action of a watch. Pressure is placed upon the above assembly by the spring in drum 64 through pinion 76, flipper 77 and star 78. When the star has been permitted by escapement wheel 79 to move sufficiently to release the flipper, the latter will turn one-half of a revolution when the star will again stop it. Drum 64 and hence cam 74 are thus permitted to move also, the gear ratio between pinion 76 and drum 64 being such that after the flipper 77 is released, cam 74 moves just enough to shift the end of pawl 73 from a land to a groove or vice versa. When the latter is riding on a land, it exerts a pressure against disc 72 sufficient to overcome the friction between shaft 70 and sleeve 71, thereby stopping mirror 46. When the pawl is in a groove of cam 74, sleeve 71 and mirror 46 are free to rotate with shaft 70.

If the light beams were allowed to travel at all times towards the rotating mirror 46 in the paths shown in Fig. 3, a distorted record of the two outer beams would be obtained since the photographed image would be completely inverted once during each revolution of the mirror. Means are, therefore, provided for counteracting this effect of the mirror in order that an undistorted record may be obtained and, preferably, such means comprise an erecting prism 42 which is so constructed as to invert an image which passes through the same and which is adjustably mounted by means of set screws 83 in a rotatable sleeve 84 (Fig. 1). Since the prism has the same effect upon the beams during a half revolution as does mirror 46 in a full revolution, the former is driven at one-half the speed of the latter through suitably proportioned idler gears 85 and 85a which are interposed between a gear 86 on sleeve 71 and a gear 86a on sleeve 84.

Means are provided for preventing sudden accelerations of the clockwork or watch mechanism and for maintaining the speed of rotation of mirror 46 substantially constant. Such means are constituted by a train of step-up gearing such as gears 87, 88 and 89, the former being in mesh with drum 63 and the latter having a wind vane 90 drivably connected thereto. An inertia mass 91 may be frictionally mounted on shaft 76a for preventing excessively sudden starting and stopping of flipper 77.

It will be noted that the light beams are directed in slightly diverging paths so that by the time the beams reach the photographic film, the divergence will be such that a separate and distinct record of each of the vibration components is obtained. Since these are magnified records, it is necessary to calibrate the instrument to determine the amplification constant before the same is placed in use. Any member which follows a motion, the characteristics of which are known, and to which the instrument can be conveniently attached, may be used as a standard for this purpose.

If desired, means may be provided for holding mass 12 in a fixed position during violent maneuvers or when transporting the instrument. The means herein provided for this purpose (Figs. 1 and 7) consists of a pin 92 which extends through the side of housing 5 and is provided with a conical end portion which fits into a conical depression in said mass, the latter being adapted to be moved by said pin into contact with a pair of felt-lined, U-shaped members 93 suitably secured to housing 5 about 120 degrees on either side of pin 92. The latter is held in the desired position by a spring-pressed pawl 94 which engages grooves in said pin.

In operation, light 35a is first illuminated, a new length of film is exposed by turning knob 53, and the springs in drums 63 and 64 are energized by turning knob 65a. Mirror 46 is then intermittently rotated for definite intervals of time as explained in detail above. The rays from light 35a are directed by condenser lens 39 through apertures 40 and against mirrors 24a, 29a and 34a. If the instrument is mounted on a vibrating member, these mirrors will be oscillated as described above in accordance with the longitudinal, transverse and vertical components, respectively, of the vibrations of said member. A like motion is, therefore, imparted to the light beams, which said mirrors direct, through lens 41, prism 42 and prisms 43, 44 against mirror 46 and the film. When mirror 46 is rotating, a record such as shown in Fig. 3 is obtained.

There is thus provided a novel method for recording vibration characteristics and a novel vibration recording instrument for carrying out said method, said instrument employing novel means for converting the component of the vibrations of a member along any axis into angular motion. Novel means are also provided for obtaining an undistorted readily readable record of such component, a record from which the characteristics of the vibrations of said member may be readily ascertained. Moreover, the instrument provided is of such size and weight that the same will not substantially alter the vibrating characteristics of the member, upon which it is mounted and is of such nature that it is adapted for recording the vibrations of a movable structure such as an airplane for example.

Although only one embodiment of the invention has been illustrated and described, it is to be expressly understood that the same is not limited thereto but that various changes may be made. Reference will, therefore, be had, primarily, to the appended claims for a definition of the limits of the invention.

What is claimed is:

1. In a recording instrument of the type including a casing having a mass resiliently mounted therein for relative movement between it and the casing in at least two mutually perpendicular directions, and also having light-projecting and photographic image-receiving means therein for producing a photographic record of the amplitude and frequency of vibrations in each of said directions, respectively, upon relative movement between said mass and casing, the combination of a support secured to and movable with said casing, a plurality of spindles journaled in said support, one for each corresponding direction in which vibrations are to be recorded, means carried by the mass and engaging said spindles for causing the latter to move angularly according to the respective directions of vibrations and according to the magnitude of said vibrations upon relative movement between the casing and mass due to said vibrations, a mirror on each spindle and movable therewith whereby a light-beam projected on each of said mirrors is caused to vibrate, a pair of light-reflecting members simultaneously rotatable at different speeds by means of which each of said vibrating light beams from each of said mirrors, respectively, is reflected onto a stationary light-sensitive film, and a timing mechanism for rotating said reflecting members at predetermined times for predetermined intervals.

2. In a recording instrument of the type including a casing having a mass resiliently mounted therein for relative movement between it and the casing in at least two mutually perpendicular directions, and also having light-projecting and photographic image-receiving means therein for producing a photographic record of the amplitude and frequency of vibrations in each of said directions, respectively, upon relative movement between said mass and casing, the combination of a support secured to and movable with said casing, a plurality of spindles journaled in said support, one for each corresponding direction in which vibrations are to be recorded, means carried by the mass and engaging said spindles for causing said spindles to move angularly according to the respective directions of vibrations and according to the magnitude of said vibrations upon relative movement between the casing and mass due to said vibrations, a mirror on each spindle and movable therewith whereby a light beam projected on each of said mirrors is caused to vibrate, a pair of light-reflecting members simultaneously rotatable at different speeds by means of which each of said vibrating light beams from each of said mirrors, respectively, is reflected onto a stationary light sensitive film, and a spring-actuated clock mechanism for rotating said reflecting members at predetermined times for predetermined intervals.

3. In a recording instrument of the type including a casing having a mass resiliently mounted therein for relative movement between it and the casing in at least two mutually perpendicular directions, and also having light-projecting and photographic image-receiving means therein for producing a photographic record of the amplitude and frequency of vibrations in each of said directions, respectively, upon relative movement between said mass and casing, the combination of a support secured to and movable with said casing, a plurality of spindles journaled in said support, one for each corresponding direction in which vibrations are to be recorded, means carried by the mass and engaging said spindles for causing the latter to move angularly on their respective axes according to the respective directions of vibrations and according to the magnitude of said vibrations upon relative movement between the casing and mass due to said vibrations, a mirror on each spindle and movable therewith whereby a light beam projected on each of said mirrors is caused to vibrate, a rotatable reflecting member by means of which each of said vibrating light beams from each of said mirrors, respectively, is reflected onto a stationary light-sensitive film, and a timing mechanism for rotating said reflecting member at predetermined times for predetermined intervals.

4. In a recording instrument of the type including a casing having a mass resiliently mounted therein for relative movement between it and the casing in at least two mutually perpendicular directions, and also having light-projecting and photographic image-receiving means therein for producing a photographic record of the amplitude and frequency of vibrations in each of said directions, respectively, upon relative movement between said mass and casing, the combination of a support secured to and movable with said casing, a plurality of spindles journaled in said support, one for each corresponding direction in which vibrations are to be recorded, means carried by the mass and engaging said spindles for causing the latter to move angularly on their respective axes according to the respective directions of vibrations and according to the magnitude of said vibrations upon relative movement between the casing and mass due to said vibrations, a mirror on each spindle and movable therewith whereby a light beam projected on each of said mirrors is caused to vibrate, a rotatable reflecting member by means of which each of said vibrating light beams from each of said mirrors, respectively, is reflected onto a stationary light-sensitive film, and a spring-actuated clock mechanism for rotating said reflecting member at predetermined times for predetermined intervals.

VICTOR E. CARBONARA.